(12) United States Patent
Yamauchi et al.

(10) Patent No.: US 7,031,569 B2
(45) Date of Patent: Apr. 18, 2006

(54) OPTICAL MULTI-DEMULTIPLEXER

(75) Inventors: Junji Yamauchi, Koganei (JP);
Michiya Masuda, Yokohama (JP);
Ryouichi Tazawa, Yokohama (JP);
Hisamatsu Nakano, Kodaira (JP);
Yuichi Yamamoto, Koganei (JP)

(73) Assignee: NHK Spring Co., LTD, Kanagawa (JP)

( * ) Notice: Subject to any disclaimer, the term of this patent is extended or adjusted under 35 U.S.C. 154(b) by 116 days.

(21) Appl. No.: 10/676,210

(22) Filed: Oct. 1, 2003

(65) Prior Publication Data
US 2004/0170355 A1 Sep. 2, 2004

(30) Foreign Application Priority Data
Oct. 1, 2002 (JP) ............................. 2002-288860

(51) Int. Cl.
*G02B 6/34* (2006.01)
(52) U.S. Cl. ........................... 385/37; 385/24; 385/129
(58) Field of Classification Search ................. 385/14, 385/15, 24, 37, 129, 132; 438/31
See application file for complete search history.

(56) References Cited

U.S. PATENT DOCUMENTS

| 6,549,696 B1 * | 4/2003 | Uetsuka et al. ............... 385/24 |
| 6,787,868 B1 * | 9/2004 | McGreer et al. ............. 257/425 |
| 6,879,748 B1 * | 4/2005 | Kaneko ........................ 385/24 |
| 2002/0159696 A1 * | 10/2002 | Yamauchi et al. ............. 385/37 |
| 2003/0026544 A1 | 2/2003 | Lin |

FOREIGN PATENT DOCUMENTS

| JP | 7-333447 | 12/1995 | .................. 385/37 |
| JP | 9-297228 | 11/1997 | .................. 385/37 |
| JP | 10-197735 | 7/1998 | .................. 385/37 |
| JP | 2002-14243 | 1/2002 | |
| JP | 2002-148458 | 5/2002 | |
| JP | 2002-202420 | 7/2002 | |
| WO | WO 02/069007 A1 | 9/2002 | |

* cited by examiner

*Primary Examiner*—Frank G. Font
*Assistant Examiner*—Christopher M. Kalivoda
(74) *Attorney, Agent, or Firm*—Scully, Scott Murphy & Presser

(57) ABSTRACT

An arrayed-waveguide grating type optical multi-demultiplexer includes input waveguides, a first slab waveguide, a channel waveguide array, a second slab waveguide, and output waveguides. A pair of different refractive index regions, each having a refractive index different from that of the second slab waveguide, are formed on the second slab waveguide near a boundary between the second slab waveguide and channel waveguide array. The different refractive index regions project in peninsular shapes from both side portions of the slab waveguide. Light traveling from each waveguide of the channel waveguide array toward the output waveguides passes through the different refractive index regions. An optical distribution with a flattened field-distribution peak is created at a boundary between the second slab waveguide and output waveguides.

9 Claims, 4 Drawing Sheets

OPTICAL MULTI-DEMULTIPLEXER

CROSS-REFERENCE TO RELATED APPLICATIONS

This application is based upon and claims the benefit of priority from the prior Japanese Patent Application No. 2002-288860, filed Oct. 1, 2002, the entire contents of which are incorporated herein by reference.

BACKGROUND OF THE INVENTION

1. Field of the Invention

The present invention relates generally to an arrayed-waveguide grating type optical multi-demultiplexer for use in multiplexing or demultiplexing a wavelength division multiplexing optical signal, and more particularly to an optical multi-demultiplexer having wide-band optical wavelength characteristics.

2. Description of the Related Art

In the field of optical communications, research attempts have been made to develop a wavelength division multiplexing transmission system that aims at increasing an information capacity by carrying a plurality of signals on light components with different wavelengths and transmitting them through a single optical fiber. In this transmission system, an optical multi-demultiplexer plays an important role in multiplexing or demultiplexing the light components with different wavelengths. Of a variety of types of optical multi-demultiplexers, an optical multi-demultiplexer using an arrayed waveguide grating (AWG) is a promising one since the number of multiplexed wavelengths can be increased with narrow wavelength intervals or spacings.

Examples of the arrayed waveguide grating are disclosed in Jpn. Pat. Appln. KOKAI Publication No. 7-333447, Jpn. Pat. Appln. KOKAI Publication No. 9-297228 and Jpn. Pat. Appln. KOKAI Publication No. 10-197735.

A conventional arrayed waveguide grating comprises input waveguides formed on a substrate; output waveguides; a channel waveguide array composed of a number of curved waveguides; an input fan-shaped slab waveguide formed between the input waveguides and the channel waveguide array; and an output fan-shaped slab waveguide formed between the channel waveguide array and the output waveguides. The channel waveguide array is formed such that the optical path lengths of the curved waveguides are gradually increased from the inside toward the outside of the curved configuration of the curved waveguides thereof so that the adjacent waveguides may have predetermined differences in optical path length.

Thus, wavelength division multiplexing optical signals, which have been incident on input-side ends of the respective waveguides of the channel waveguide array, propagate to output-side ends of the waveguides, while optical phase differences are occurring among the signals in accordance with the frequencies of the signals. The amount of phase difference varies depending on the wavelength of light, and the wavefront of the converged beam is tilted in accordance with its wavelength. Consequently, the respective positions of convergence of light beams in the output fan-shaped slab waveguide vary depending on the respective wavelengths of the light beams. Demultiplexed beams with different wavelengths are converged on output waveguides at different positions in accordance with the respective wavelengths.

If the refractive index of the fan-shaped slab waveguide is uniform and a Gaussian-type input field distribution is provided, as in the prior art, then a Gaussian-distribution type field distribution is accordingly produced at convergence points. As a result, wavelength characteristics have a single peak at a central wavelength of each channel, as in the prior art.

FIG. 10 shows an electric field distribution at a boundary between the output fan-shaped slab waveguide and the output waveguides in the above-described conventional arrayed-waveguide grating. This electric field distribution has a sharp peak at a center of the beam. Thus, if a light component with the peak of electric field can exactly be made incident on the center of a predetermined output waveguide, light can be transmitted with high efficiency.

FIG. 11 shows wavelength characteristics of the conventional arrayed-waveguide grating. In FIG. 11, the abscissa indicates the wavelength, and the ordinate indicates the loss. As shown in FIG. 11, the conventional arrayed-waveguide grating has parabolic wavelength characteristics having peaks at central wavelengths of the respective waveguides.

Consequently, the conventional arrayed-waveguide grating has the following problem. If the wavelength of a laser light source varies even slightly from a central optical wavelength of each waveguide due to, e.g. a temperature variation, the optical loss would considerably increase.

This problem can be solved to some degree by an arrayed-waveguide grating 1 shown in FIG. 12. The arrayed-waveguide grating 1 includes parabolic portions 4 between input waveguides 2 and a fan-shaped slab waveguide 3. Each parabolic portion 4 has such a quadratic-functional shape that the core of the associated input waveguide 2 widens gradually toward the fan-shape slab waveguide 3. A channel waveguide array 5 is connected to the slab waveguide 3.

In the above-described prior art, each parabolic portion 4 provides multiple modes to light that propagates from the associated input waveguide 2 to the slab waveguide 3, and a high-order mode is produced. Thereby, a field distribution with double peaks is created, and wide-band characteristics of a certain level can be obtained.

However, in the arrayed-waveguide grating 1 having the parabolic portions 4, the optical path length increases by a degree corresponding to the parabolic portions 4, leading to an increase in size of the whole structure. In addition, the parabolic portions 4 formed on the adjacent waveguides 2 are situated close to each other. Consequently, when the arrayed-waveguide grating 1 is manufactured, it is difficult to sufficiently bury a clad layer among the cores of the parabolic portions 4.

BRIEF SUMMARY OF THE INVENTION

The object of the present invention is to provide an optical multi-demultiplexer capable of obtaining wide-band optical wavelength characteristics without complicating the manufacture thereof.

An optical multi-demultiplexer according to the present invention comprises: input waveguides formed on a substrate; a channel waveguide array including a plurality of curved waveguides arranged such that optical path lengths of adjacent ones of the curved waveguides are gradually increased from an inside toward an outside of a curved configuration of the curved waveguides; output waveguides formed on the substrate; a first slab waveguide formed between the input waveguides and the channel waveguide array; and a second slab waveguide formed between the channel waveguide array and the output waveguides. The optical multi-demultiplexer further comprises a different refractive index region formed at a position close to the channel waveguide array within the second slab waveguide, relative to a central portion in the longitudinal direction of the second slab waveguide, the different refractive index region having a refractive index different from a refractive index of the second slab waveguide, and the different refractive index region extending in a direction in which the waveguides of the channel waveguide array are arranged.

With the provision of the different refractive index region, the convergence point of light can be displaced. Specifically, since the different refractive index region is provided in the second slab waveguide, a 1 dB bandwidth or a 3 dB bandwidth, for instance, can remarkably be increased, and wide-band optical wavelength characteristics with a flattened electric field distribution can be obtained. Therefore, even in a case where the wavelength of a light source such as a laser has varied from a central wavelength of each signal channel due to a temperature variation, etc., an increase in passage loss can be suppressed.

The different refractive index region may be formed of a material with a lower refractive index than, e.g. a core of the second slab waveguide. In addition, the different refractive index region may be formed of a material with a refractive index equal to a refractive index of a clad layer of the second slab waveguide.

In the present invention, the different refractive index region may have a tapered shape decreasing in width toward a central portion of the second slab waveguide.

In this invention, the different refractive index region may have a higher refractive index than a core of the second slab waveguide. In this case, the different refractive index region should preferably have a reverse-tapered shape increasing in width toward a central portion of the second slab waveguide.

In a preferred embodiment of the invention, the different refractive index region comprises a pair of peninsular different refractive index regions projecting from both sides of the second slab waveguide toward a central portion of the second slab waveguide. With this structure, convergence points of light made incident from the channel waveguide array on the second slab waveguide, which are symmetrically located in two groups, are symmetrically displaced. Thereby, a flat optical distribution, in which a plurality of electric field distributions overlap each other, is created at a boundary between the second slab waveguide and the output waveguides. The convergence points of light emerging from the respective waveguides of the channel waveguide array, which are symmetrically located in two groups, are symmetrically displaced. Therefore, a flat field distribution can easily be obtained, and an optical distribution with a wider band is obtained.

In the present invention, the different refractive index region may be spaced apart from each of both side portions of the second slab waveguide.

In this invention, the different refractive index region may have a width varying in a direction in which the waveguides of the channel waveguide array are arranged. With this structure, the length, over which each of light components crosses the different refractive index region, can be varied in units of a light component, and the convergence point of each light component can be shifted by a desired amount.

In the present invention, the different refractive index region may have a width or a refractive index varying in a direction in which the waveguides of the channel waveguide array are arranged. Thereby, a phase difference can be provided among light components crossing the different refractive index region, and the convergence point of each light component can be shifted by a desired amount.

In a preferred embodiment of the invention, island regions having a refractive index different from each of the first and second slab waveguides are formed, in addition to the different refractive index region, on at least one of a position close to the channel waveguide array within the first slab waveguide and a position close to the channel waveguide array within the second slab waveguide. With this structure, loss in the whole optical multi-demultiplexer can be decreased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A first embodiment of the present invention will now be described with reference to FIG. 1 to FIG. 8.

Figure 1:
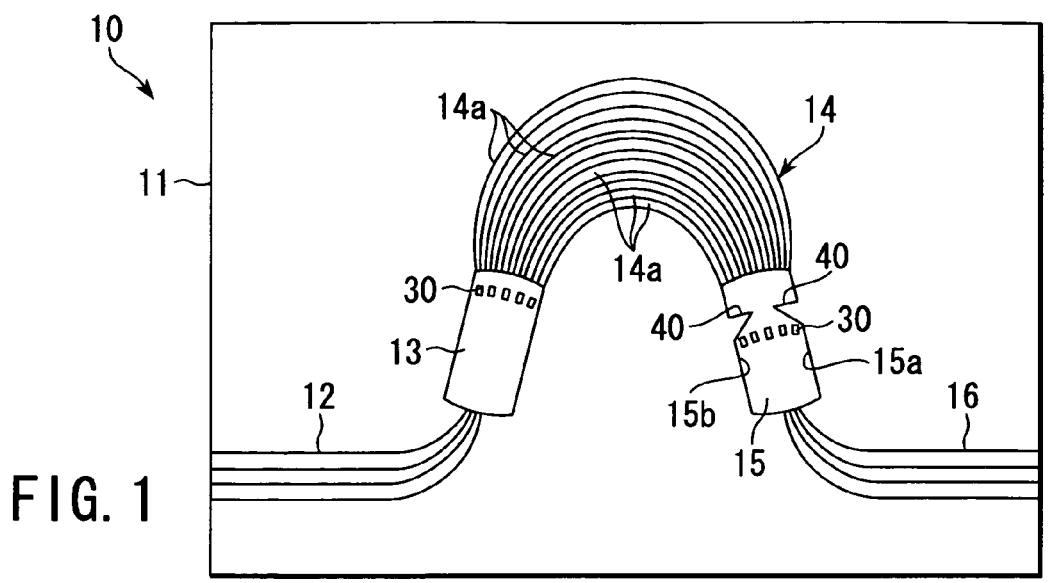
FIG. 1 is a plan view of an optical multi-demultiplexer according to a first embodiment of the present invention.

FIG. 1 shows an arrayed-waveguide grating (AWG) type optical multi-demultiplexer 10. The optical multi-demultiplexer 10 comprises the following components formed on a substrate 11: a plurality of input waveguides 12, a first fan-shaped slab waveguide 13, a channel waveguide array 14 composed of a number of curved waveguides 14a, a second fan-shaped slab waveguide 15, and a plurality of output waveguides 16. Optical fibers (not shown) are connected to the input waveguides 12 and output waveguides 16.

The first slab waveguide 13 is formed between the input waveguides 12 and the channel waveguide array 14. The first slab waveguide 13 optically connects the input waveguides 12 and channel waveguide array 14.

The second slab waveguide 15 is formed between the channel waveguide array 14 and output waveguides 16. The second slab waveguide 15 optically connects the waveguides 14a of channel waveguide array 14 and the output waveguides 16.

Figure 3:
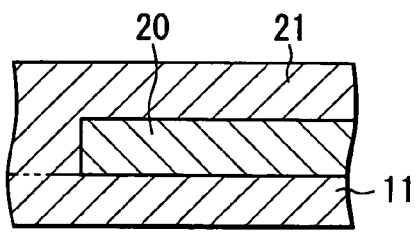
FIG. 3 is a partial cross-sectional view of the optical multi-demultiplexer, taken along line F3—F3 in FIG. 2.

As is shown in FIG. 3, the slab waveguide 13, 15 includes a substrate 11 formed of, e.g. quartz glass or silicon, a planar core 20 provided on the substrate 11, and a clad layer 21 covering the core 20.

The channel waveguide array 14 has a plurality of curved waveguides 14a having different lengths. The optical path lengths of the waveguides 14a are increased in succession from an inside toward an outside of a curved configuration of the waveguides 14a such that adjacent ones of the waveguides 14a may have a predetermined difference $\Delta L$ in optical path length.

Thus, a wavelength division multiplexing optical signal, which has been made incident on one end of the associated one of waveguides 14a of the channel waveguide array 14, propagates to the other end of the waveguides 14a, while optical phase differences are occurring among the optical signals in accordance with the frequencies of the optical signals. The amount of phase difference varies depending on the wavelength of light, and the wavefront of the converged beam is tilted in accordance with its wavelength. Consequently, the respective positions of convergence of light beams in the second slab waveguide 15 vary depending on the respective wavelengths of the light beams. Demultiplexed beams with different wavelengths are converged on the output waveguides 16 at different positions in accordance with the respective wavelengths.

For convenience, in this specification, the waveguides (e.g. waveguides 12) on the incidence side are referred to as input waveguides, and the waveguides (e.g. waveguides 16) on the emission side as output waveguides. If the light is incident in the opposite direction, however, the waveguides 12 serve as the output waveguides, and the waveguides 16 as the input waveguides.

Figure 2:
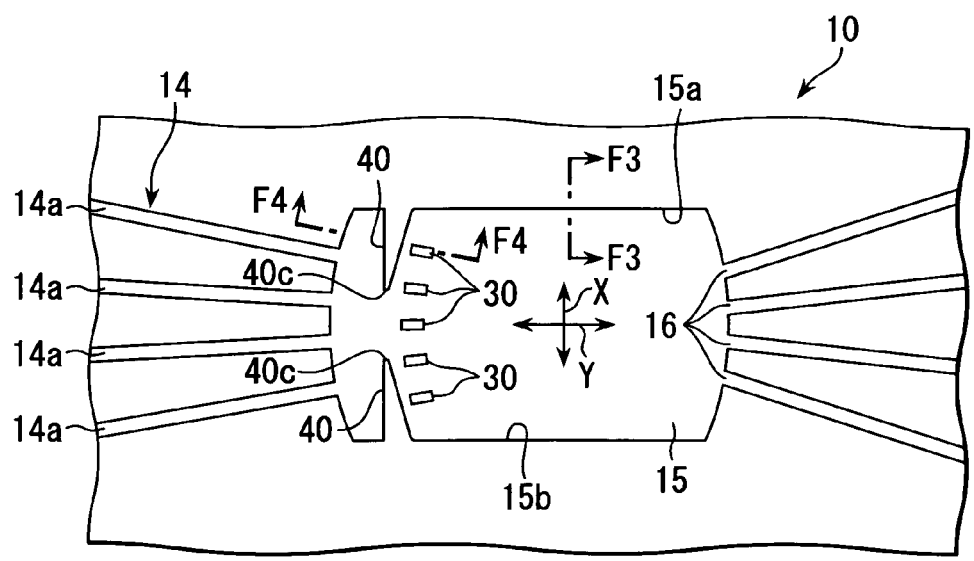
FIG. 2 schematically shows, in enlarged scale, a second slab waveguide, etc. of the optical multi-demultiplexer shown in FIG. 1.

In the optical multi-demultiplexer 10, a plurality of island regions 30 (schematically shown in FIGS. 1 and 2) are formed on at least one of the first slab waveguide 13 and second slab waveguide 15. FIGS. 1 and 2 schematically show only part of the waveguides 12, 14a, 16 and island regions 30.

Figure 4:
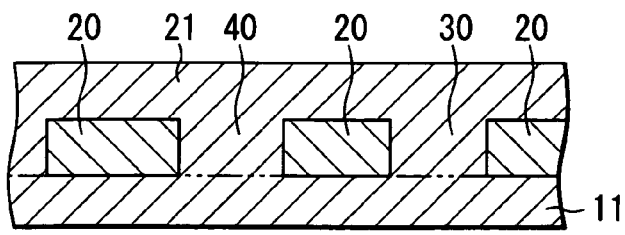
FIG. 4 is a partial cross-sectional view of the optical multi-demultiplexer, taken along line F4—F4 in FIG. 2.

As is shown in FIG. 4, the island regions 30 are formed integral with the clad layer 21 on the substrate 11 of, e.g. quartz glass. The refractive index of the island region 30 is lower than that of the core 20 that is present adjacent to the island region 30.

The island regions 30 are formed at positions associated with the waveguides 14a of the channel waveguide array 14. For example, in the first slab waveguide 13, the island regions 30 are formed in between axes that connect the waveguides 14a of channel waveguide array 14 and the input waveguides 12. Depending on how to use the optical multi-demultiplexer 10, the island regions 30 may be provided on both the first slab waveguide 13 and second slab waveguide 15, or on one of them.

As is shown in FIG. 2, a pair of different refractive index regions 40 are formed in the vicinity of a boundary between the channel waveguide array 14 and the second slab waveguide 15. The different refractive index regions 40 are formed in peninsular shapes, projecting from both side portions 15a and 15b of the second slab waveguide 15 toward the center of the slab waveguide 15.

Each different refractive index region 40 is formed at a position close to the channel waveguide array 14 within the second slab waveguide 15, that is, at a position close to the channel waveguide array 14 relative to a central position in the longitudinal direction of the slab waveguide 15. The refractive index of the different refractive index region 40 differs from that of the second slab waveguide 15. In the present embodiment, the refractive index of the different refractive index region 40 is lower than that of the core 20 of the second slab waveguide 15.

Preferably, the refractive index of the different refractive index region 40 is equal to that of the clad layer 21. Thus, the clad layer 21 and different refractive index region 40 can be integrally formed of the same material. The different refractive index region 40 extends in a direction in which the waveguides 14a of channel waveguide array 14 are arranged, that is, in the width direction of the slab waveguide 15 (indicated by an arrow X in FIG. 2).

The width W (shown in FIG. 5) of each different refractive index region 40 increases in a tapered fashion from the center of the slab waveguide 15 toward the side portion 15a, 15b. In other words, the width W of the different refractive index region 40 varies in a direction (direction of arrow X) in which the waveguides 14a of channel waveguide array 14 are arranged. In a case where the refractive index of the different refractive index region 40 is lower than that of the core 20 of the slab waveguide 15, the different refractive index region 40 is formed in a tapered shape with a width decreasing toward the center of the slab waveguide 15. The taper shape of the different refractive index region 40 is optimally determined, taking into account a relative refractive index difference in the optical multi-demultiplexer 10, the length of the slab waveguide 15, the core size of the input and output waveguides 12 and 16, etc.

The refractive index of the different refractive index region 40 may be higher than that of the core 20 of the slab waveguide 15. In this case, the different refractive index region 40 may preferably be formed in a reverse-tapered shape with a width increasing toward the center of the slab waveguide 15.

The refractive index of the different refractive index region 40 may be so adjusted as to vary in a direction (direction of arrow X) in which the waveguides 14a of channel waveguide array 14 are arranged.

A method of manufacturing the above optical multi-demultiplexer 10 is described.

Quartz glass was used as material of the substrate 11. The core 20 of the slab waveguide 13, 15 and each waveguide 14a of channel waveguide array 14 were integrally formed of germanium-doped quartz glass with a thickness of 6 μm. Examples of the method of forming glass include CVD (chemical vapor deposition), flame hydrolysis deposition (FHD) and evaporation. Conditions for the formation were: the refractive index ($nc_1$) of clad layer 21=1.4574, the refractive index ($nc_0$) of the core 20 and each waveguide 14a of channel waveguide array 14=1.4684, the relative refractive index difference $\Delta$=0.75%, and the cross section of each waveguide 14a of channel waveguide array 14=6×6 μm$^2$.

The patterns of the core 20, island regions 30 and different refractive index regions 40 were formed at the same time by reactive ion etching (RIE). After the pattern formation, the clad layer 21 with a predetermined thickness was formed. Those portions of the core 20, where the island regions 30 and different refractive index regions 40 are to be formed, are etched away. After the core 20 is partly etched, the clad layer 21 is formed to a predetermined thickness. Thereby, part of the clad layer 21 is buried in the etched portions of the core 20. In a case where the substrate 11 is formed of silicon, a lower clad layer (not shown) is formed between the substrate 11 and core 20.

The operation of the multi-demultiplexer 10 will now be described.

Wavelength division multiplexing signal light made incident on the first slab waveguide 13 from the input waveguide 12 has a single mode, and it generally has a Gaussian-distribution type power distribution. The light incident on the first slab waveguide 13 spreads in the core 20 of first slab waveguide 13 in the lateral direction (width direction) of the slab waveguide 13. The spread light enters each waveguide 14a of channel waveguide array 14.

The optical path lengths of the curved waveguides 14a of the channel waveguide array 14 are gradually increased from the inside toward the outside of the curved configuration of waveguides 14a. Therefore, the wavelength division multiple signals applied to the respective waveguides 14a undergo an optical phase shift for each frequency as they are incident on the second slab waveguide 15.

The light components of the wavelength division multiple signals, which have propagated in the second slab waveguide 15, travel to different convergence points according to their wavelengths at the boundary between the second slab waveguide 15 and output waveguides 16. The light components with the respective wavelengths pass through the peninsular different refractive index regions 40, while traveling to the output waveguides 16. Thus, a convergence state, as described below, occurs at the boundary between the second slab waveguide 15 and output waveguides 16.

Figure 5:
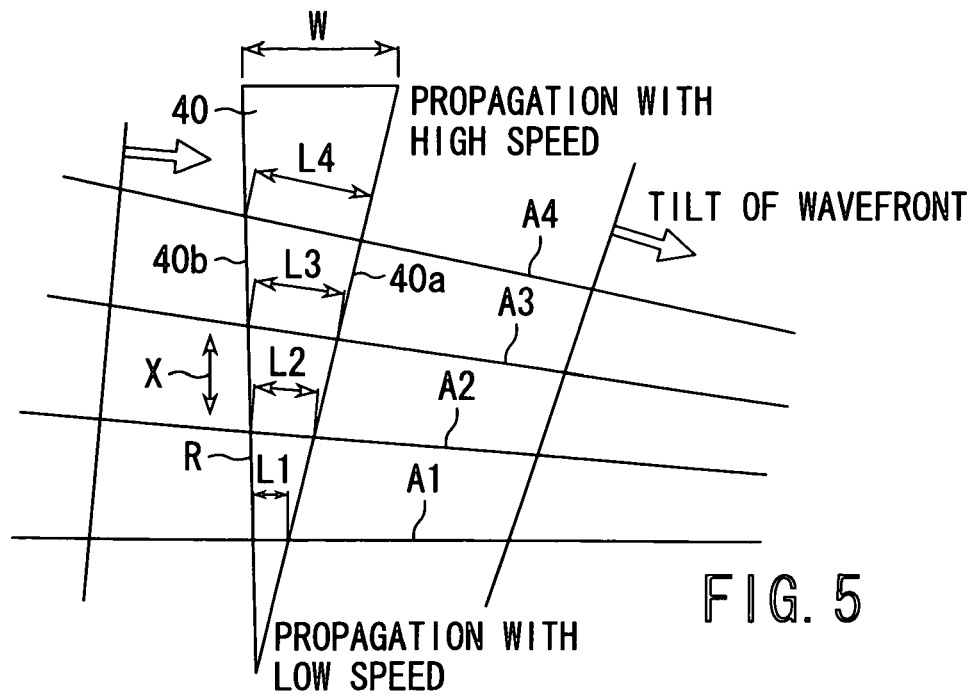
FIG. 5 schematically shows a state in which a wavefront of light passing through a different refractive index region is tilted in the optical multi-demultiplexer shown in FIG. 1.
Figure 6:
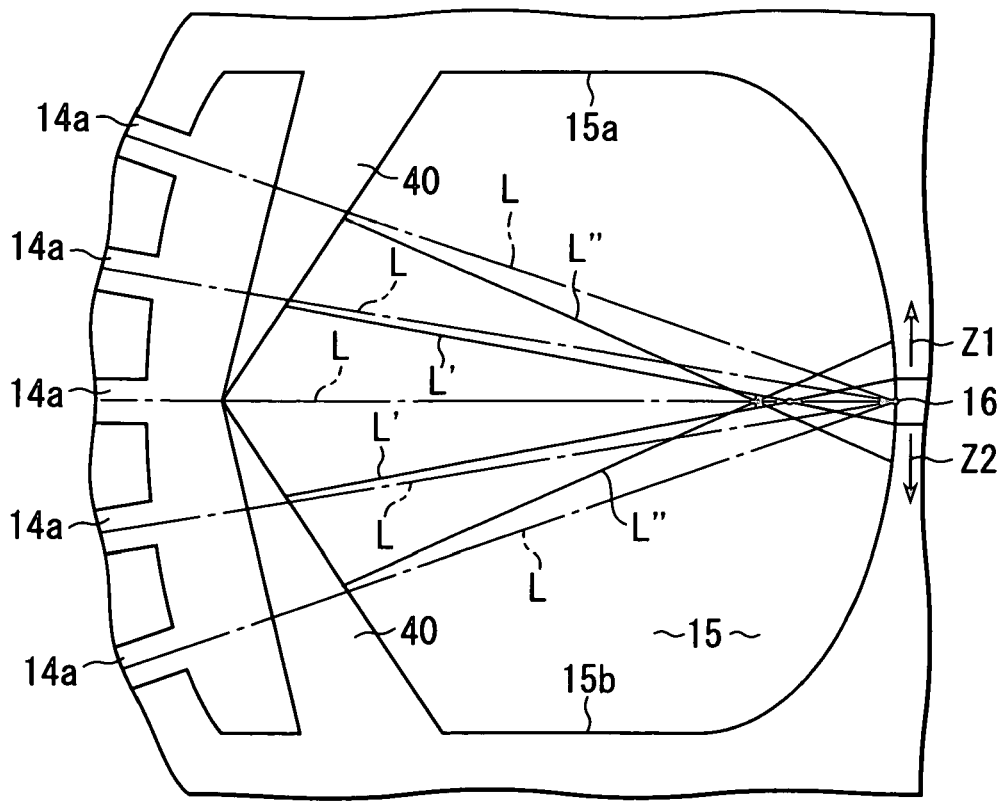
FIG. 6 schematically shows a state in which convergence points of light passing through the different refractive index region are shifted in the optical multi-demultiplexer shown in FIG. 1.

Specifically, the light emerging from each waveguide 14a of channel waveguide array 14 and entering the second slab waveguide 15 reaches the peninsular different refractive index region 40, as shown in FIG. 5, while traveling toward the output waveguides 16. When the light components A1, A2, A3 and A4 cross the different refractive index region 40, they travel over different distances L1, L2, L3 and L4 within the different refractive index region 40. As a result, phase differences occur among the light components A1, A2, A3 and A4.

In the case where the refractive index of the different refractive index region 40 is lower than that of the slab waveguide 15, the field in the different refractive index region 40 is more accelerated as the light component travels in a region closer to the side portion 15a, 15b of the slab waveguide 15. Accordingly, the wavefront is tilted, as shown in FIG. 5, and the convergence point shifts inward, compared to the normal convergence point which would exist if the different refractive index region 40 were not provided.

In the case where the different refractive index region 40 is not provided, the number of convergence points (in-phase points) is one. However, if the different refractive index region 40 is provided, the convergence point (in-phase point) spreads, as indicated by L' and L" in FIG. 6. Although L' and L" are longer than L, light passes through the different refractive index region 40 at a higher speed. Consequently, the point, where the light passing through L', L" becomes in phase with the convergence point in the prior art, is displaced in directions of arrows Z1 and Z2. As a result, the field distribution at the convergence point becomes wider.

Figure 7:
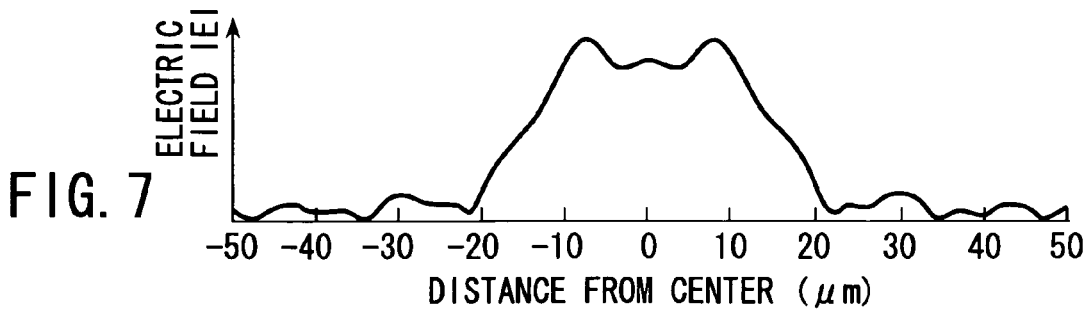
FIG. 7 shows an electric field distribution at a boundary between the second slab waveguide and the output waveguides in the optical multi-demultiplexer shown in FIG. 1.

Accordingly, the equally divided right-hand and left-hand groups of convergence points of light components, which have emerged from the waveguides 14a of channel waveguide array 14, are shifted toward the side portions 15a and 15b of the slab waveguide 15. Hence, the field distribution spreads like a double-peak distribution, and a nearly flat field distribution, as shown in FIG. 7, is obtained.

In theory, the aforementioned phase difference can be obtained by gradually varying the difference in optical path length of the waveguide array 14. In reality, however, a very delicate control of optical path length is required, and so manufacture is difficult. By contrast, the formation of the different refractive index region 40 is not difficult.

In order to confirm the above advantages, simulation of the multi-demultiplexer 10 was conducted by beam propagation analysis under the following parameters. Examples of the parameters are as follows. The cross-sectional dimensions of each waveguide 14a of channel waveguide array 14 are 6×6 µm. The relative refractive index difference Δ is 0.75%. The length of each of the slab waveguides 13 and 15 is 9381 µm. The pitch of each of the input waveguides 12 and output waveguides 16 is 25 µm. The pitch of the waveguides 14a of channel waveguide array 14 is 25 µm. The optical path length difference of between the respective waveguides 14a is 126 µm.

In this embodiment, in order to decrease loss in the multi-demultiplexer 10, the island regions 30 are formed on the first slab waveguide 13 and the second slab waveguide 15. The shape of each island region 30 is trapezoidal. The width of the trapezoid is 12.64 µm, the upper side thereof is 3.62 µm, and the length (the height of the trapezoid) is 64.57 µm. The distance between the island regions 30 and the channel waveguide array 14 is 123.43 µm.

Figure 8:
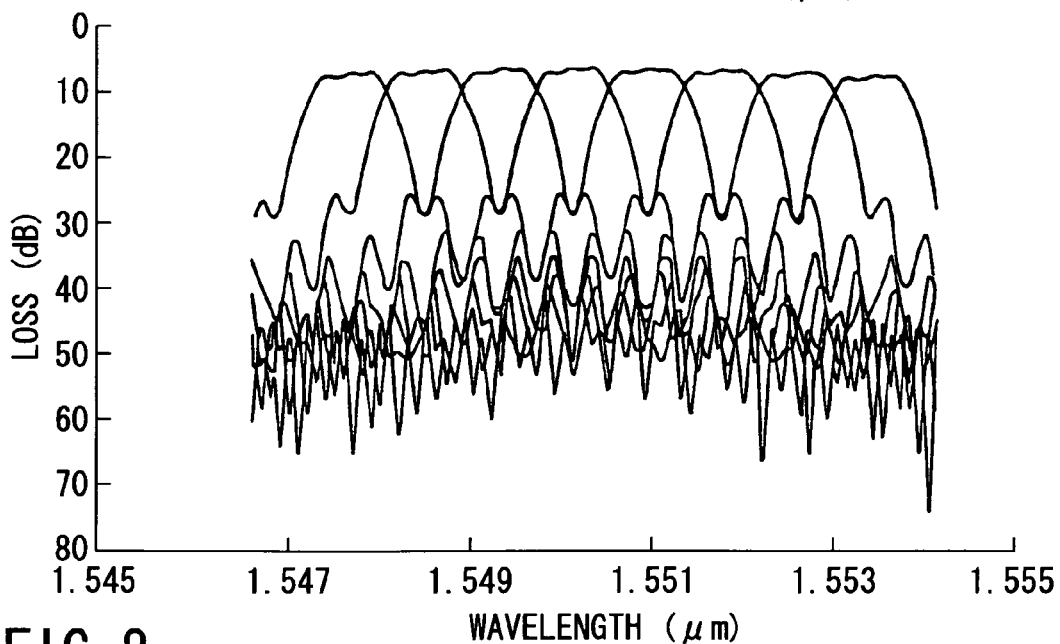
FIG. 8 shows an example of wavelength characteristics of the optical multi-demultiplexer shown in FIG. 1.

FIG. 8 shows the simulation result.

With the provision of the island regions 30, the loss due to insertion in the whole multi-demultiplexer 10 was successfully limited to about 1.3 dB. The spacing between demultiplexed wavelengths was 100 GHz in terms of frequencies.

The peninsular different refractive index region 40 for realizing a broader band may be formed on the second slab waveguide 15 alone. A surface 40a of the different refractive index region 40, which is located on the output waveguide 16 side (i.e. a surface 40a opposed to the output waveguide 16) is slightly curved along a direction in which the island regions 30 are arranged.

A surface 40b of the different refractive index region 40, which is located on the channel waveguide array 14 side, that is, a surface 40b opposed to each waveguide 14a of channel waveguide array 14, is formed along a line segment R (shown in FIG. 5). Assume that the lengths, over which the light components A1 to A4 traveling from the waveguides 14a toward the normal convergence point cross the different refractive index region 40, are L1 to L4, respectively. In this case, the line segment R is a line formed by connecting points at which the lengths L1 to L4 extend in units of 3.3 µm toward the side portion 15a (or 15b) from the center of the slab waveguide 15.

An apex 40c (shown in FIG. 2) of each different refractive index region 40 is located at a distance of 115 µm from an end portion of the second slab waveguide 15, which is located on the channel waveguide array 14 side. By virtue of the different refractive index regions 40, the convergence points of light in the slab waveguide 15, which are equally divided into the right-hand and left-hand groups, can be shifted.

A simulation was conducted by beam propagation analysis. It was found that the multi-demultiplexer 10 of this embodiment exhibited wavelength demultiplexing characteristics with the wavelength spacing of 100 GHz, like the conventional arrayed-waveguide grating. It was confirmed that the multi-demultiplexer 10 has a wide band width, such as a 1 dB band width of 62.5 GHz or a 3 dB band width of 87.5 GHz, in the wavelength spacing of 100 GHz.

By contrast, the conventional arrayed-waveguide grating without the provision of the different refractive index region 40 has a narrow band width, such as a 1 dB band width of 12.5 GHz or a 3 dB band width of 25 GHz, in the wavelength spacing of 100 GHz.

A simulation was conducted, with the position of the refractive index region 40 being shifted in the longitudinal direction of the slab waveguide 15 (indicated by arrow Y in FIG. 2). The shape of the refractive index region 40 is determined such that the lengths, over which the light components emerging from the waveguides 14a of channel waveguide array 14 cross the different refractive index region 40, have an equal degree of variation between adjacent waveguides 14a. With the refractive index region 40 having this shape, the same field distribution was successfully obtained, regardless of the position of the refractive index region 40.

For example, simulation was conducted for three cases where the position of the apex 40c of refractive index region 40 is located at distances of 110 μm, 115 μm and 120 μm from the end of the second slab waveguide 15 (i.e. the boundary with the channel waveguide array 14). It was found that the field distributions in the three cases overlap each other. In short, the same field distribution was obtained irrespective of the position of the refractive index region 40.

In the above-described embodiment, the island regions 30 were formed in order to enhance loss characteristics. Even in an arrayed-waveguide grating without the island regions 30, the provision of the refractive index regions 40 can realize wide-band characteristics, like the above-described embodiment.

Figure 9:
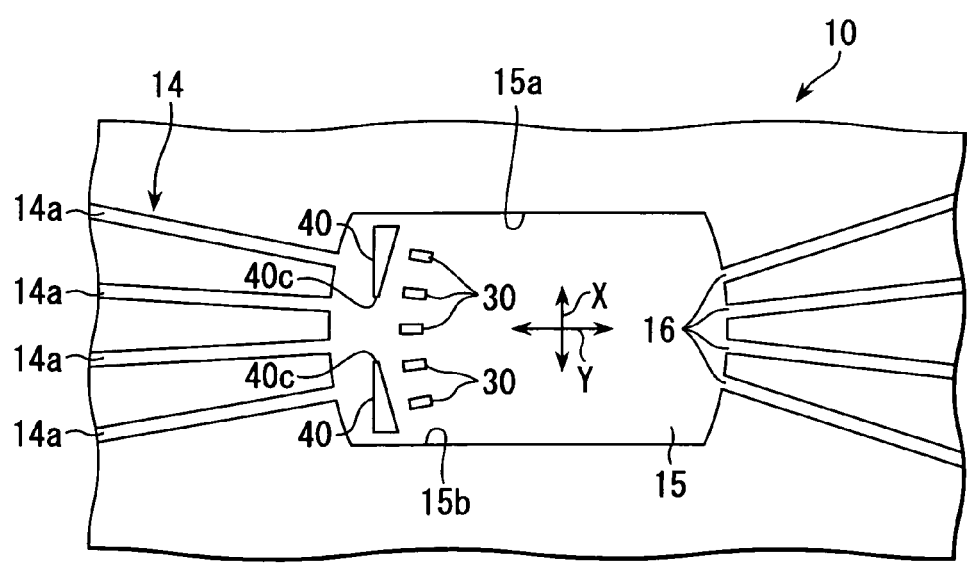
FIG. 9 is a plan view of an optical multi-demultiplexer according to a second embodiment of the present invention.
Figure 10:
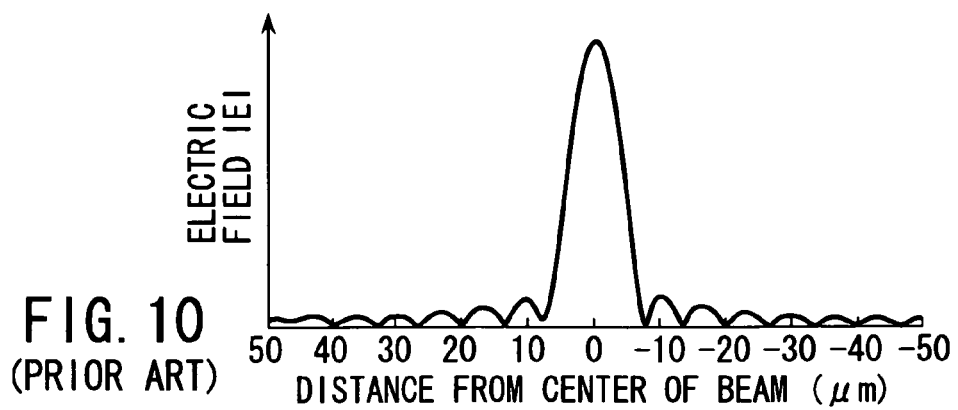
FIG. 10 shows an electric field distribution at a boundary between a second slab waveguide and output waveguides in a conventional arrayed-waveguide grating.
Figure 11:
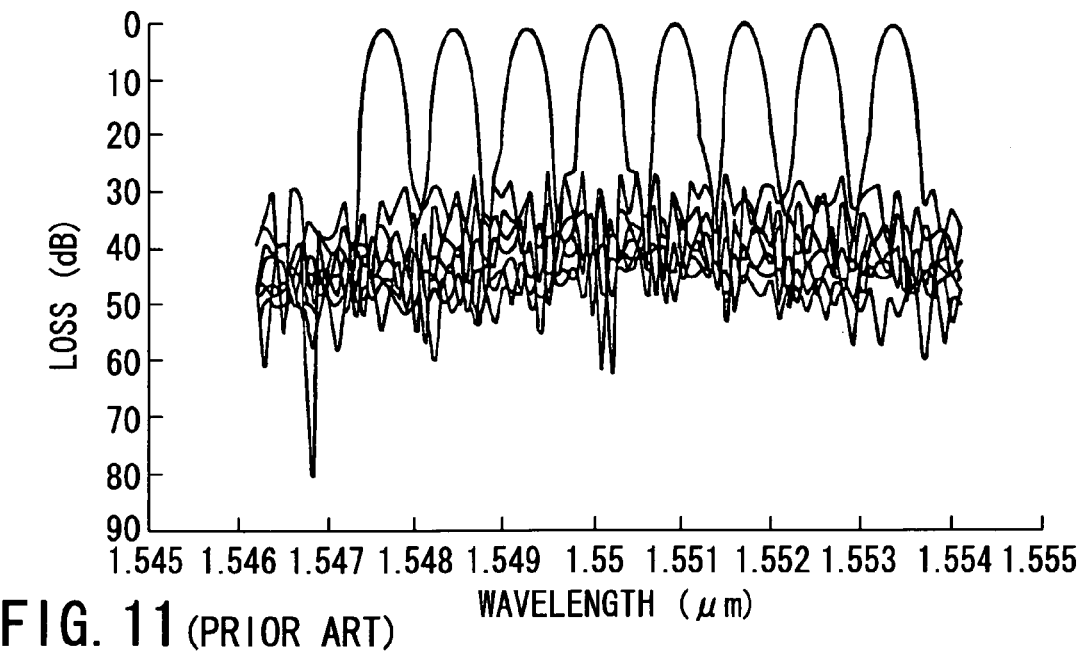
FIG. 11 shows wavelength characteristics of the conventional arrayed-waveguide grating.
Figure 12:
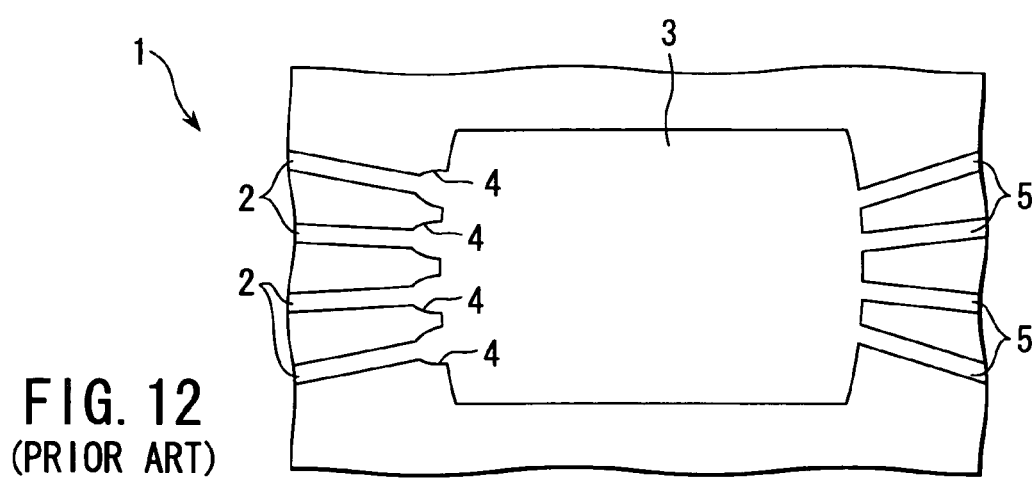
FIG. 12 is a plan view showing an example of a conventional arrayed-waveguide grating having parabolic portions.

FIG. 9 shows a multi-demultiplexer 10 according to a second embodiment of the invention. Like this embodiment, different refractive index regions 40 may be spaced apart from both side portions 15a and 15b of the second slab waveguide 15. In the other respects, the structure and advantages of the multi-demultiplexer 10 according to the second embodiment are the same as those of the multi-demultiplexer 10 according to the first embodiment. Thus, the parts common to those of the first embodiment are denoted by like reference numerals, and a description thereof is omitted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical multi-demultiplexer comprising:
    a substrate;
    input waveguides formed on the substrate;
    a channel waveguide array including a plurality of curved waveguides arranged such that optical path lengths of adjacent ones of the curved waveguides are gradually increased from an inside toward an outside of a curved configuration of the curved waveguides;
    output waveguides formed on the substrate;
    a first slab waveguide formed between the input waveguides and the channel waveguide array;
    a second slab waveguide formed between the channel waveguide array and the output waveguides, and
    a different refractive index region formed at a position close to the channel waveguide array within the second slab waveguide, the different refractive index region having a lower refractive index than a core of the second slab waveguide, the different refractive index region extending in a direction in which the waveguides of the channel waveguide array are arranged, and
    the different refractive index region having a tapered shape decreasing in width from both side portions toward a central portion of the second slab waveguide.

2. The optical multi-demultiplexer according to claim 1, wherein the different refractive index region has a refractive index equal to a refractive index of a clad layer of the second slab waveguide.

3. The optical multi-demultiplexer according to claim 1, wherein the different refractive index region comprises a pair of peninsular different refractive index regions projecting from both sides of the second slab waveguide toward a central portion of the second slab waveguide.

4. The optical multi-demultiplexer according to claim 1, wherein the different refractive index region is spaced apart from each of both sides of the second slab waveguide.

5. The optical multi-demultiplexer according to claim 1, wherein the different refractive index region has a width varying in a direction in which the waveguides of the channel waveguide array are arranged.

6. The optical multi-demultiplexer according to claim 1, wherein the different refractive index region has a refractive index varying in a direction in which the waveguides of the channel waveguide array are arranged.

7. The optical multi-demultiplexer according to claim 1, wherein island regions having a refractive index different from each of the first and second slab waveguides are formed, in addition to the different refractive index region, on at least one of a position close to the channel waveguide array within the first slab waveguide and a position close to the channel waveguide array within the second slab waveguide.

8. An optical multi-demultiplexer comprising:
    a substrate;
    input waveguides formed on the substrate;
    a channel waveguide array including a plurality of curved waveguides arranged such that optical path lengths of adjacent ones of the curved waveguides are gradually increased from an inside toward an outside of a curved configuration of the curved waveguides;
    output waveguides formed on the substrate;
    a first slab waveguide formed between the input waveguides and the channel waveguide array;
    a second slab waveguide formed between the channel waveguide array and the output waveguides, and
    a different refractive index region formed at a position close to the channel waveguide array within the second slab waveguide, the different refractive index region having a higher refractive index than a core of the second slab waveguide, the different refractive index region extending in a direction in which the waveguides of the channel waveguide array are arranged, and the different refractive index region having a reverse-tapered shape increasing in width from both side portions toward a central portion of the second slab waveguide.

9. An optical multi-demultiplexer comprising:

a substrate;

input waveguides formed on the substrate;

a channel waveguide array including a plurality of curved waveguides arranged such that optical path lengths of adjacent ones of the curved waveguides are gradually increased from an inside toward an outside of a curved configuration of the curved waveguides;

output waveguides formed on the substrate;

a first slab waveguide formed between the input waveguides and the channel waveguide array;

a second slab waveguide formed between the channel waveguide array and the output waveguides, and a different refractive index region formed at a position close to the channel waveguide array within the second slab waveguide, the different refractive index region having a higher refractive index than a core of the second slab waveguide, the different refractive index region extending in a direction in which the waveguides of the channel waveguide array are arranged, wherein the different refractive index region comprises a pair of peninsular different refractive index regions projecting from both sides of the second slab waveguide toward a central portion of the second slab waveguide.

* * * * *